US007916586B2

(12) United States Patent
Jeong et al.

(10) Patent No.: US 7,916,586 B2
(45) Date of Patent: Mar. 29, 2011

(54) NEAR FIELD OPTICAL RECORDING/REPRODUCING APPARATUS AND METHOD OF NORMALIZING GAP ERROR SIGNAL OF THE SAME

(75) Inventors: An-sik Jeong, Hwaseong-si (KR); Jong-hyun Shin, Suwon-si (KR); In-joo Kim, Suwon-si (KR); Mu-kun An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 12/128,006

(22) Filed: May 28, 2008

(65) Prior Publication Data

US 2009/0180372 A1    Jul. 16, 2009

(30) Foreign Application Priority Data

Jan. 10, 2008    (KR) .................. 10-2008-0002929

(51) Int. Cl.
*G11B 7/00*    (2006.01)
(52) U.S. Cl. .................................. 369/44.29
(58) Field of Classification Search ........... None
See application file for complete search history.

(56) References Cited

U.S. PATENT DOCUMENTS

| 6,292,442 | B1 | 9/2001 | Kasono | |
| 6,693,705 | B2 | 2/2004 | Sohn et al. | |
| 6,717,896 | B1 | 4/2004 | Imanishi | |
| 6,845,066 | B1 | 1/2005 | Shingo | |
| 7,755,986 | B2 * | 7/2010 | Ishimoto | 369/44.23 |
| 2007/0217300 | A1 * | 9/2007 | Koyama et al. | 369/44.23 |
| 2007/0280065 | A1 * | 12/2007 | Fukuhara | 369/44.29 |
| 2008/0037380 | A1 * | 2/2008 | Ishimoto | 369/44.11 |

FOREIGN PATENT DOCUMENTS

WO    WO 2007/114567    10/2007

OTHER PUBLICATIONS

International Search Report dated Aug. 19, 2008 of the PCT International Application No. PCT/KR2008/002877.

* cited by examiner

*Primary Examiner* — Peter Vincent Agustin
(74) *Attorney, Agent, or Firm* — NSIP Law, PC

(57) ABSTRACT

A near field optical recording/reproducing apparatus includes a light source, an objective lens to form a spot by focusing light emitted from the light source, a solid immersion lens to generate an evanescent wave by using the spot formed by the objective lens, a photodetector to measure an amplitude of a gap error signal that is totally reflected by the solid immersion lens, and an operating unit to generate a normalized gap error signal by using an amplitude of a driving signal applied to the light source and the amplitude of the gap error signal measured by the photodetector.

20 Claims, 4 Drawing Sheets

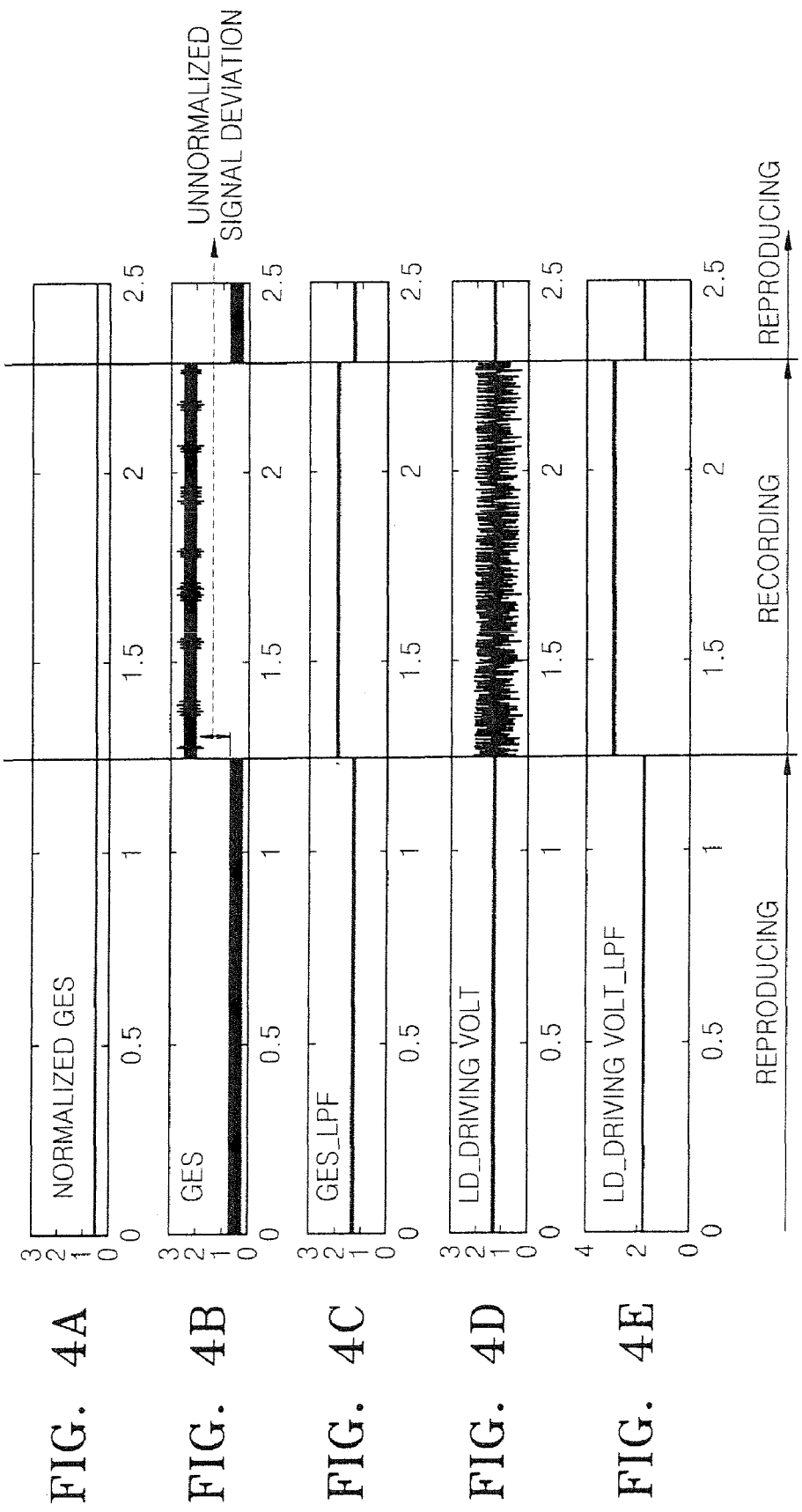

NEAR FIELD OPTICAL RECORDING/REPRODUCING APPARATUS AND METHOD OF NORMALIZING GAP ERROR SIGNAL OF THE SAME

CROSS-REFERENCE TO RELATED APPLICATION

This application claims the benefit of Korean Application No. 2008-2929 filed Jan. 10, 2008, in the Korean Intellectual Property Office, the disclosure of which is incorporated herein by reference.

BACKGROUND OF THE INVENTION

1. Field of the Invention

Aspects of the present invention relate to a near field optical recording/reproducing apparatus, and a method of normalizing a gap error signal of the same, and more particularly, to a near field optical recording/reproducing apparatus which can maintain a gap error signal constant during recording and reproducing operations by normalizing the gap error signal, and a method of normalizing the gap error signal of the same.

2. Description of the Related Art

Technology for storing information on an optical recording medium, such as an optical disc, has matured and BDs (Blu-ray discs), HD-DVDs (High Definition DVDs), as well as CDs (compact discs) and DVDs (digital versatile discs) are now commercialized. Such commercialized technologies for CDs, DVDs, BDs, and HD-DVDs involve far field storage technology in which a distance from an optical head of an optical recording/reproducing apparatus to a recording surface of an optical disc is about 1-2 mm. For such far field storage technology, even when the wavelength of light is decreased and the numerical aperture (NA) of an objective lens is increased, decreasing the size of an optical spot formed on the recording surface of the optical disc is limited due to a light diffraction phenomenon which makes it difficult to increase a recording capacity of the optical disc.

Recently, attention has been focused on an optical recording/reproducing apparatus using near field storage technology since such an optical recording/reproducing apparatus can provide a large recording capacity of over a terabyte per optical disc. For near field storage technology, by reducing a distance from an optical head thereof to a recording surface of an optical disc to be not greater than 100 nm, recording and reproducing operations are performed by transferring to (or shining on) an optical disc, an evanescent wave of light generated in a very narrow area corresponding to several tenths of the light wavelength. For example, for near field optical recording/reproducing technology using a solid immersion lens (SIL), when an optical spot is formed on a surface of the SIL by converging an incident beam with an objective lens, a considerable portion of the optical spot is totally reflected by the SIL and proceeds back to the objective lens. At this time, light of a very slight intensity exists on an opposite surface of the SIL and such a light is referred to as an evanescent wave. Thus, information can be recorded or reproduced with respect to the optical disc by transferring the energy of the evanescent wave to the optical disc through a narrow air gap between the SIL and the optical disc.

To optimize the recording and reproduction quality using the near field storage technology, it is important to maintain a constant distance between the SIL and the optical disc. Typically, the distance between the SIL and the optical disc can be obtained by measuring the intensity of light that is being totally reflected by the SIL. That is, the facts that an amount of light totally reflected by the SIL is maximized in a far field state, and an amount of light that is totally reflected by the SIL decreases as the distance between the SIL and the optical disc decreases in a near field state, are used. A light signal that proceeds back by being totally reflected by the SIL is generally referred to as a gap error signal (GES). Thus, the distance between the SIL and the optical disc can be estimated from an amplitude of the GES. For example, assuming that a voltage level of the GES in the far field state is 1 V, and the voltage level of the GES when the SIL completely contacts the optical disc is 0 V, then, when the voltage level of the GES is 0.5 V, the distance between the SIL and the optical disc can be estimated to be about 50 nm, for example.

However, since an amplitude of the GES is affected by the intensity of the light provided by a light source, when an intensity of a driving signal for driving the light source changes, it is difficult to accurately measure or detect the distance between the SIL and the optical disc. In particular, since the intensity of the light during a recording operation is about ten times greater than that during a reproduction operation, the amplitude of the GES remarkably changes when a recording mode is switched to a reproducing mode or vice versa. Thus, in order to maintain a constant distance between the SIL and the optical disc as a recording mode is switched to a reproducing mode or vice versa, normalization of the GES is needed to make the GES constant regardless of the intensity of the driving signal of the light source.

SUMMARY OF THE INVENTION

To solve the above and/or other problems, aspects of the present invention provide a near field optical recording/reproducing apparatus which can maintain a constant gap error signal (GES) during recording and reproduction operations by normalizing the GES, and a method of normalizing the GES of the same.

According to an aspect of the present invention, a near field optical recording/reproducing apparatus includes a light source to emit light, an objective lens to form a spot by focusing the light emitted from the light source, a solid immersion lens to generate an evanescent wave of the light from the spot of the light formed by the objective lens, a photodetector to measure an amplitude of a gap error signal from the light that is totally reflected by the solid immersion lens, and an operating unit to generate a normalized gap error signal by using an amplitude of a driving signal applied to the light source to emit the light and the amplitude of the gap error signal measured by the photodetector.

According to an aspect of the present invention, the operating unit calculates a normalization factor by dividing the amplitude of the driving signal, measured in a far field state of the near field optical recording/reproducing apparatus, by the amplitude of the gap error signal, measured in the far field state thereof.

According to an aspect of the present invention, the operating unit generates a normalized gap error signal by dividing the amplitude of the gap error signal, measured during reproduction or recording operations of the near field optical recording/reproducing apparatus, by the amplitude of the driving signal, measured during the reproduction or recording operations of the near field optical recording/reproducing apparatus, and multiplying a result of the division by the normalization factor.

According to an aspect of the present invention, the near field optical recording/reproducing apparatus further includes a first low pass filter arranged between the light source and the operating unit with respect to the driving signal, and removing a high frequency component of the driving signal provided to the operating unit, and a second low pass filter arranged between the photodetector and the operating unit with respect to the gap error signal, and removing a high frequency component of the gap error signal provided to the operating unit.

According to an aspect of the present invention, the near field optical recording/reproducing apparatus further includes an actuator having the objective lens and the solid immersion lens mounted thereon and performing a gap servo operation according to the normalized gap error signal provided by the operating unit.

According to another aspect of the present invention, a method of normalizing a gap error signal of a near field optical recording/reproducing apparatus includes measuring an amplitude of a driving signal applied to a light source of the near field optical recording/reproducing apparatus and an amplitude of the gap error signal in a far field state of the near field optical recording/reproducing apparatus when the near field optical recording/reproducing apparatus is initialized, calculating a normalization factor by dividing the amplitude of the driving signal applied to the light source by the amplitude of the gap error signal measured in the far field state, measuring the amplitude of the driving signal applied to the light source and the amplitude of the gap error signal during reproduction or recording operations of the near field optical recording/reproducing apparatus, and generating a normalized gap error signal by dividing the amplitude of the gap error signal measured during the reproduction or recording operations of the near field optical recording/reproducing apparatus, by the amplitude of the driving signal measured during the reproduction or recording operations of the near field optical recording/reproducing apparatus, and multiplying a result of the division by the normalization factor.

According to an aspect of the present invention, the method further includes performing a gap servo operation of the near field optical recording/reproducing apparatus according to the normalized gap error signal.

According to an aspect of the present invention, the method further includes removing high frequency components of the driving signal and the gap error signal using a low pass filter prior to the calculating of the normalization factor and the generating of the normalized gap error signal.

According to an aspect of the present invention, the normalized gap error signal is constantly maintained to be a preset optimized value regardless of the recording and reproduction operations of the near field optical recording/reproducing apparatus.

According to an aspect of the present invention, a near field optical recording/reproducing apparatus used to record/reproduce information to/from an optical medium includes: a light source to emit light; an objective lens to focus the light emitted from the light source; a solid immersion lens to receive the focused light from the objective lens to generate an evanescent wave of the focused light, and to totally reflect a portion of the focused light back towards the light source; a photodetector to measure an amplitude of a gap error signal from the totally reflected portion of the focused light; and an operating unit to generate a normalized gap error signal used to maintain a constant gap between the solid immersion lens and the optical medium, wherein the normalized gap error signal is a constant value during both a recording operation and a reproducing operation of the near field optical recording/reproducing apparatus.

According to an aspect of the present invention, a method of performing a gap servo control of a near field optical recording/reproducing apparatus using a normalized gap error signal, includes: measuring an amplitude of a gap error signal from a portion of a focused light that is totally reflected from a solid immersion lens of the near field optical recording/reproducing apparatus; generating the normalized gap error signal that maintains a constant value during both a recording operation and a reproducing operation of the near field optical recording/reproducing apparatus; and using the normalized gap error signal to maintain a constant gap between the solid immersion lens and an optical medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIGS. 4A-4E illustrate changes in driving signals and a GESs between reproduction operations and recording operations in a near field optical recording/reproducing apparatus according to an aspect of the present invention.

DETAILED DESCRIPTION OF THE EMBODIMENTS

Figure 1:
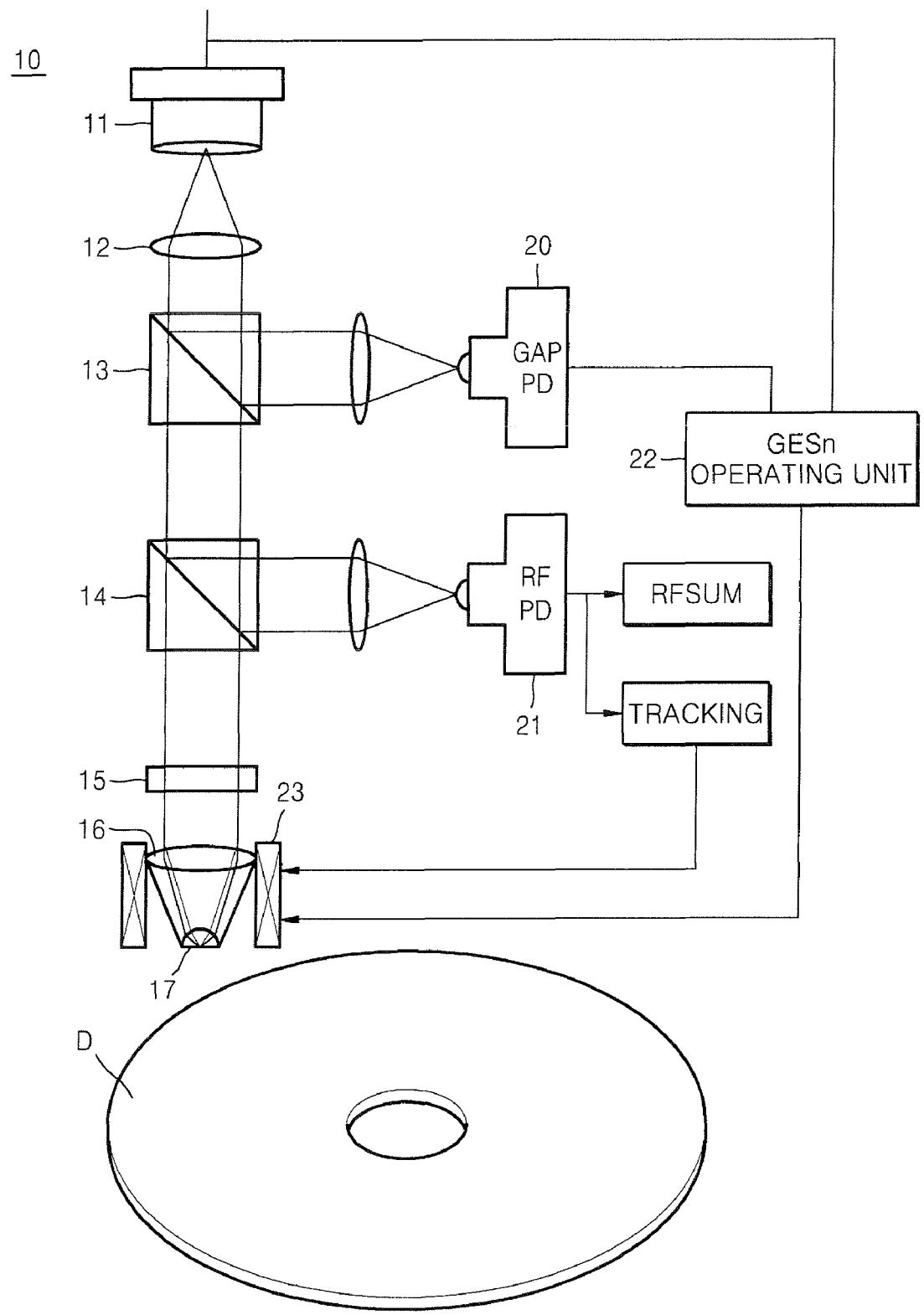
FIG. 1 illustrates a structure of a near field optical recording/reproducing apparatus according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

FIG. 1 illustrates a structure of a near field optical recording/reproducing apparatus 10 according to an aspect of the present invention. Referring to FIG. 1, the near field optical recording/reproducing apparatus 10 includes a light source 11, a collimating lens 12, first and second beam splitters 13 and 14, a ¼ wave plate 15, an objective lens 16, a solid immersion lens (SIL) 17, first and second photodetectors 20 and 21, an operating unit 22, and an actuator 23.

The light source 11 provides a light beam (or a light) to record information to an optical disc D or reproduce information from the optical disc D. For example, a blue laser diode (LD) of a 405 nm wavelength can be used as the light source 11. Also, the collimating lens 12 converts the light beam emitted by the light source 11 to a parallel beam.

The first beam splitter 13 transmits the light from the light source 11 and reflects light that is totally reflected from the SIL 17 towards the first photodetector 20. Also, the second beam splitter 14 transmits the light from the light source 11 and reflects the light reflected from the optical disc D towards the second photodetector 21. For example, the first and second beam splitters 13 and 14 can be polarized beam splitters that transmit or reflect an incident light according to the polarizing direction of the incident light. The ¼ wave plate 15 delays the phase of the incident light by a ¼ wave. Thus, when the light passes the ¼ wave plate 15 twice, the polarization direction of the light is changed, for example, from an S-polarization to a P-polarization or vice versa.

The objective lens 16 focuses the light provided by the light source 11 and forms a spot on a surface of the SIL 17. As described above, a part of the light that forms the spot is totally reflected from the surface of the SIL 17 and proceeds back to the light source 11. In doing so, a fine evanescent wave is formed on an opposite surface of the SIL 17 that faces the optical disc D. When the distance between the optical disc D and the SIL 17 is less than 100 nm, that is, in the near field state, the evanescent wave is transferred to (or incident on) the optical disc D so as to be used for recording/reproduction of information.

Also, the first photodetector 20 detects an amplitude of a gap error signal (GES) that is totally reflected from the surface of the SIL 17 and then reflected by the first beam splitter 13. As described above, the amplitude of the GES detected by the first photodetector 20 is maximized in the far-field state and decreases as the distance between the optical disc D and the SIL 17 in the near-field state decreases. As discussed above, the gap error signal (GES) refers to a light signal that proceeds back by being totally reflected by the SIL 17.

The operating unit 22 receives the amplitude of the GES detected by the first photodetector 20 and an amplitude of a driving signal of the light provided to the light source 11, and calculates a normalized GES (GESn). As described above, the amplitude of the GES detected by the first photodetector 20 is also affected by the intensity of the light provided by the light source 11. Thus, the operating unit 22 calculates the GESn that is not affected by the amplitude of the driving signal provided to the light source 11, by referring to the amplitude of the driving signal provided to the light source 11. The GESn obtained as above is transmitted to the actuator 23 so as to be used for performing a gap servo operation of the SIL 17 relative to the optical disc D.

The second detector 21 detects the intensity of the light input through the second beam splitter 14 after the light is reflected from the optical disc D. As it is well known, the second photodetector 21 is a multi-divided photodetector that is divided into a plurality of segments. The sum of the intensity of light detected by the respective segments is an RFSUM signal that is used for the reproduction of information from the optical disc D. Also, a difference in the intensity of the light detected in the respective segments is a tracking error (TE) signal that is used to perform a tracking servo operation according to a well-known technique. Since the RFSUM signal and the TE signal are not directly related to aspects of the present invention and are also well-known techniques, a detailed description thereof will be omitted herein. The actuator 23 has the objective lens 16 and the SIL 17 mounted thereon, and performs a gap servo operation and a tracking servo operation based the GESn and the tracking error signal.

Figure 2:
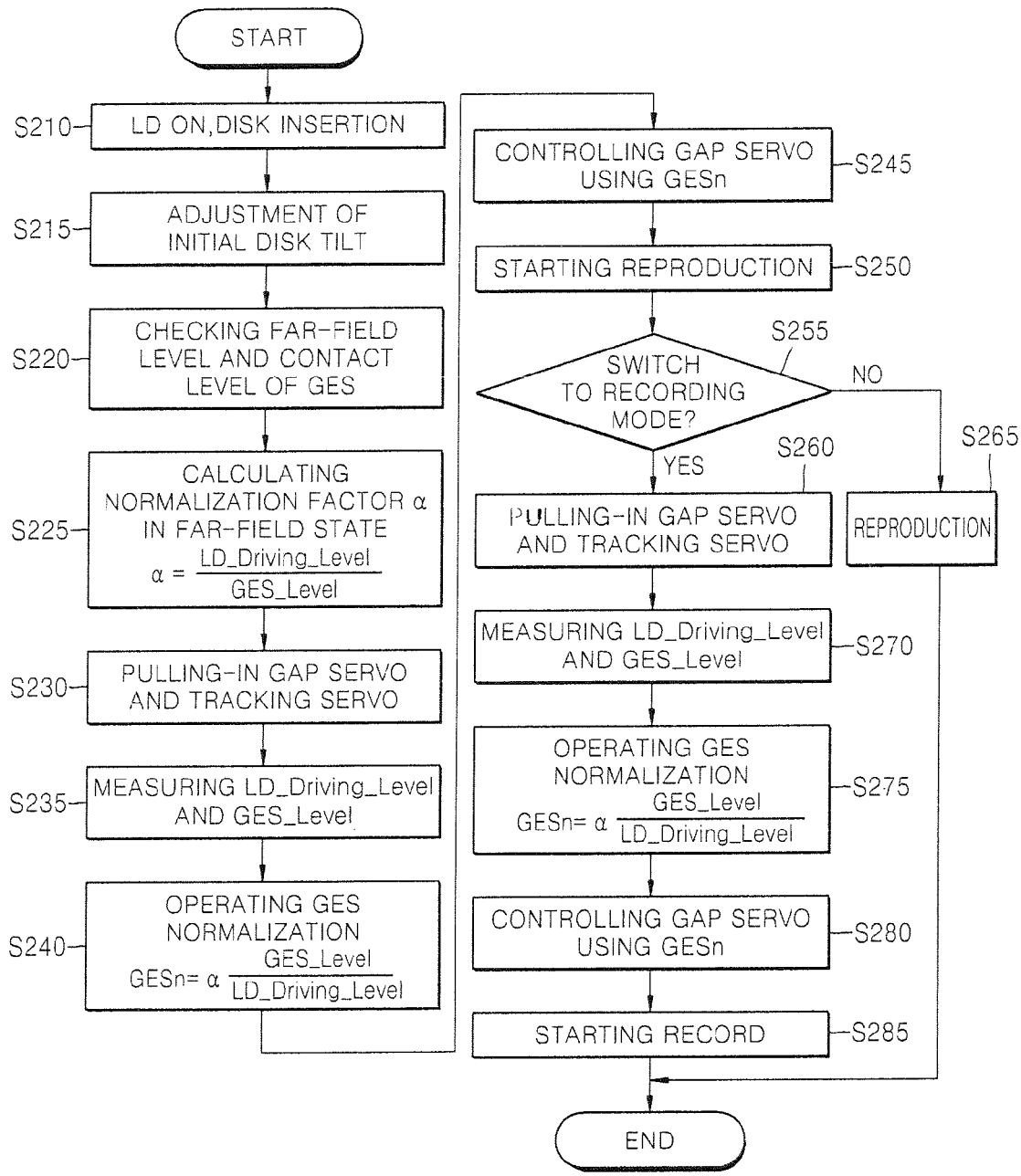
FIG. 2 is a flow chart for explaining an operational sequence of the near field optical recording/reproducing apparatus of FIG. 1.

FIG. 2 is a flow chart for explaining an operational sequence of the near field optical recording/reproducing apparatus 10, according to an aspect of the present invention. Referring to FIGS. 1 and 2, an operation of the near field optical recording/reproducing apparatus 10 and a method of normalizing a gap error signal (GES) will now be described in detail.

When an optical disc D is inserted in the near field optical recording/reproducing apparatus 10 and the light source 11 is enabled (S210), an initial tilt of the optical disc D is adjusted in an initialization operation (S215). The actuator 23 is moved up and down to determine the amplitude of the GES in the far field state (a far field level) and the amplitude of the GES in a state in which the optical disc D contacts the SIL 17 (a contact level) (S220). These operations are the same as an initialization operation of a typical near field optical recording/reproducing apparatus.

Then, according to an aspect of the present invention, the SIL 17 is moved to a far field position using the actuator 23. The operating unit 22 obtains a normalization factor α using an amplitude GES_Level of the GES detected by the first photodetector 20 in the far field state and an amplitude LD_Driving_Level of the driving signal applied to the light source 11, as follows.

$$\alpha = (LD\_Driving\_Level)/(GES\_Level) \quad \text{[Equation 1]}$$

That is, the normalization factor α calculated by the operating unit 22 is obtained by dividing the amplitude LD_Driving_Level of the driving signal applied to the light source 11 by the amplitude GES_Level of the GES detected by the first photodetector 20 in the far field state (S225).

After the normalization factor a, is calculated as above, the actuator 23 is pulled-in to a near field position so that the gap servo and tracking servo are possible (or enabled) for reproduction (S230). Then, the amplitude LD_Driving_Level of the driving signal applied to the light source 11 and the amplitude GES_Level of the GES are continuously measured. The operating unit 22 calculates the GESn using the continuously measured value as follows.

$$GESn = \alpha \times (GES\_Level)/(LD\_Driving\_Level) \quad \text{[Equation 2]}$$

That is, the GESn calculated by the operating unit 22 is obtained by dividing the amplitude GES_Level of the GES measured during a reproduction operation by the amplitude LD_Driving_Level of the driving signal measured during the reproduction operation, and then, multiplying a result of the division by the normalization factor α (S240). In the far field state, since (GES_Level)/(LD_Driving_Level) is a reciprocal number to the normalization factor α, the GESn=1 (that is, equal to 1). However, in the near field state, since the value of GES_Level decreases, GESn<1 (that is, less than 1). When the SIL 17 contacts the optical disc D, GESn=0 (that is, equal to 0).

Next, the gap servo of the actuator 23 is controlled using the GESn value output from the operating unit 22 (S245), and the reproduction operation begins while maintaining a preset optimal GESn value (S250). For example, when the optimal distance between the SIL 17 and the optical disc D is 50 nm, the gap servo is controlled such that the GESn value is maintained constant to be 0.5 by using the operating unit 22 and the actuator 23. If the near field optical recording/reproducing apparatus 10 is not switched to a recording mode (No of S255), the reproduction is continued (S265).

On the other hand, when the near field optical recording/reproducing apparatus 10 is switched to the recording mode (Yes of S255), the gap servo can be controlled for a recording operation (operations S265-S280) in the same manner as performed for the reproduction operation (operations S230-S245). That is, in a state in which the actuator 23 is pulled-in to the near field position so that the gap servo and the tracking servo are possible (operation S260), the amplitude LD_Driving_Level of the driving signal and the amplitude GES_Level of the GES are continuously measured (S270). The operating unit 22 obtains the GESn according to Equation 2 using the amplitude LD_Driving_Level of the driving signal and the amplitude GES_Level of the GES (operation S275). Next, the gap servo of the actuator 23 is controlled using the GESn value output from the operating unit 22 (S280), and the recording operation begins while maintaining a preset optimal GESn value (S285).

As described above, in the recording mode, the amplitude LD_Driving_Level of the driving signal applied to the light source 11 is increased by about ten times greater than that in the reproducing mode. The amplitude GES_Level of the GES measured by the first photodetector 20 is also proportionally increased. Thus, since the amplitude LD_Driving_Level of the driving signal and the amplitude GES_Level of the GES are increased at the same rate, in the recording mode, GESn=1 in the far field state and GESn<1 in the near field state. When the SIL 17 contacts the optical disc D, GESn=0. Thus, the gap servo of the actuator 23 can be controlled using the GESn value output from the operating unit 22. Recording can be performed while maintaining the preset optimal GESn value. For example, when the optimal distance between the SIL 17 and the optical disc D is 50 nm, in the recording mode, the gap servo is controlled to maintain the GESn value to be 0.5 using the operating unit 22 and the actuator 23.

According to aspects of the present invention, since the GES is normalized using the amplitude of the driving signal applied to the light source 11, even when the amplitude of the GES is changed by the change of the amplitude of the driving signal applied to the light source 11 during the switch between the recording mode and the reproducing mode of the near field optical recording/reproducing apparatus 10, the GESn can be maintained constant. Thus, the gap servo can be stably controlled by using the GESn.

Furthermore, according to aspects of the present invention, since the GES is normalized using the amplitude of the driving signal applied directly to the light source 11, a separate optical system and a photodetector to measure a change in the intensity of the light output from the light source 11 are not needed for the normalization of the GES. Thus, an additional process to adjust a gain and an offset of the separate photodetector is not needed and it is possible to very accurately normalize the GES.

Figure 3:
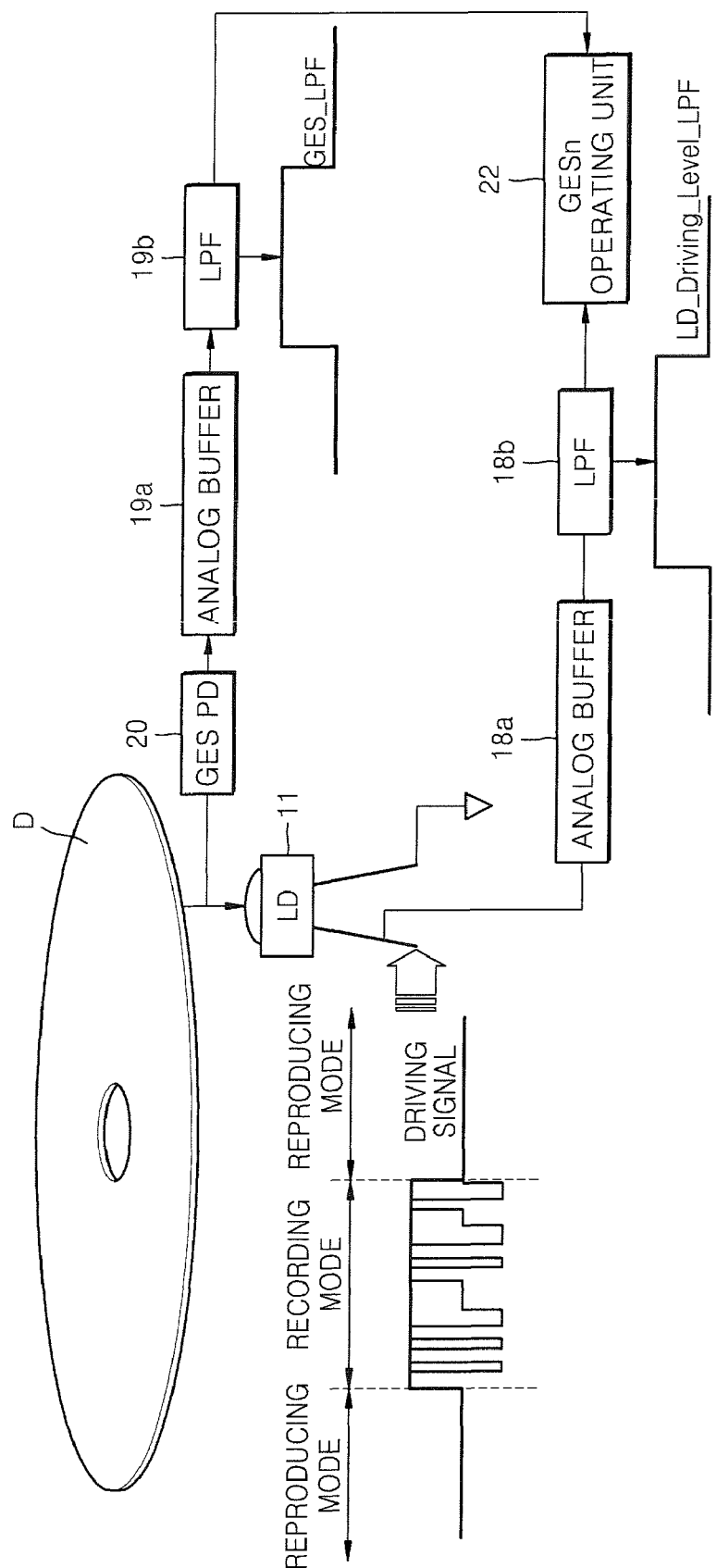
FIG. 3 illustrates a structure and operation of a near field optical recording/reproducing apparatus according to another aspect of the present invention.

FIG. 3 illustrates a structure and operation of a near field optical recording/reproducing apparatus according to another aspect of the present invention. The near field optical recording/reproducing apparatus of FIG. 3 is different for the near field optical recording/reproducing apparatus of FIG. 1 in that a buffer 18a and a low pass filter (LPF) 18b, and a buffer 19a and an LPF 19b, are respectively further provided between the light source 11 and the operating unit 22, and between the first photodetector 20 and the operating unit 22. Although in the reproduction mode, the intensity of the light output from the light source 11 is maintained almost constant, in the recording mode, light in a pulse wave form is emitted by the light source 11 according to a digital value of the information to be recorded. As a result, it is difficult to find accurate peaks of the driving signal and the GES. Thus, for the near field optical recording/reproducing apparatus of FIG. 3, by removing a high frequency component of the driving signal and the GES using the LPFs 18b and 19b, more accurate values of the amplitude LD_Driving_Level of the driving signal and the amplitude GES_Level of the GES can be obtained. A more accurate value of the GESn can be obtained using the amplitude LD_Driving_Level of the driving signal and the amplitude GES_Level of the GES from which the high frequency components are removed.

FIGS. 4A-4E illustrate changes in the driving signals and the GESs between reproduction and recording operations in a near field optical recording/reproducing apparatus, according to an aspect of the present invention. In FIG. 4D, the driving signals during reproduction and during recording operations are shown. In detail, during the reproduction operation, the driving signal is maintained almost constant. During recording, the driving signal has a pulse wave form and the amount of peaks is increased.

FIG. 4E shows the driving signal after passing through the LPF 18b. Referring to FIG. 4E, it can be seen that the driving signal during the recording operation after passing through the LPF 18b is maintained constant.

FIG. 4B shows the GES during the reproduction operation and during the recording operation. Although during the reproduction operation, the GES is maintained almost constant, during the recording operation, however, the GES has a pulse wave form. Also, during the recording operation, as the amplitude of the driving signal increases, the amplitude of the GES increases as well. Thus, when the GES is not normalized, due to a signal deviation between the reproduction and recording operations, accurate gap servo control during the recording operation is difficult with only the GES.

FIG. 4C shows the GES after passing through the LPF 19b. It can be seen that the GES during the recording operation after passing through the LPF 19b is maintained constant. Finally, FIG. 4A shows a normalized GES according to aspects of the present invention. As can be seen from FIG. 4A, the normalized GES according to an aspect of the present invention can maintain a constant value both during the reproduction operation and during the recording operation. Thus, by using the normalized GES, accurate gap servo control is possible during the reproduction operation and during the recording operation.

In aspects of the present invention, an optical recording/reproducing apparatus refers to an optical recording and/or reproducing apparatus. An optical recording and/or reproducing apparatus refers to an optical recording and reproducing apparatus, an optical recording apparatus, or an optical reproducing apparatus.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A near field optical recording/reproducing apparatus, comprising:
    a light source configured to emit light;
    an objective lens configured to form a spot by focusing the light emitted from the light source;
    a solid immersion lens configured to generate an evanescent wave of the light from the spot of the light formed by the objective lens;
    a photodetector configured to measure an amplitude of a gap error signal from the light that is totally reflected by the solid immersion lens; and
    an operating unit configured to generate a normalized gap error signal by using an amplitude of a driving signal applied to the light source to emit the light and the amplitude of the gap error signal measured by the photodetector.

2. The near field optical recording/reproducing apparatus of claim 1, wherein the operating unit is configured to calculate a normalization factor by dividing the amplitude of the driving signal, measured in a far field state of the near field optical recording/reproducing apparatus, by the amplitude of the gap error signal, measured in the far field state thereof.

3. The near field optical recording/reproducing apparatus of claim 2, wherein the operating unit is configured to generate the normalized gap error signal by dividing the amplitude of the gap error signal, measured during reproduction or recording operations of the near field optical recording/reproducing apparatus, by the amplitude of the driving signal, measured during the reproduction or recording operations of the near field optical recording/reproducing apparatus, and multiplying a result of the division by the normalization factor.

4. The near field optical recording/reproducing apparatus of claim 1, further comprising:
   a first low pass filter arranged between the light source and the operating unit with respect to the driving signal, the first low pass filter being configured to remove a high frequency component of the driving signal provided to the operating unit; and
   a second low pass filter arranged between the photodetector and the operating unit with respect to the gap error signal, the second low pass filter being configured to remove a high frequency component of the gap error signal provided to the operating unit.

5. The near field optical recording/reproducing apparatus of claim 1, further comprising an actuator having the objective lens and the solid immersion lens mounted thereon, the actuator being configured to perform a gap servo operation according to the normalized gap error signal provided by the operating unit.

6. The near field optical recording/reproducing apparatus of claim 1, further comprising:
   an actuator configured to position the solid immersion lens in a far field state and a near field state of the optical recording/reproducing apparatus so as to measure an amplitude of the gap error signal and an amplitude of the driving signal in the far field state and the near field state thereof.

7. The near field optical recording/reproducing apparatus of claim 1, wherein the operating unit is configured to generate the normalized gap error signal by using an amplitude of a driving signal applied to the light source to emit the light in a far field state and a near field state of the optical recording/ reproducing apparatus and an amplitude of the gap error signal measured by the photodetector in the far field state and the near field state of the optical recording/reproducing apparatus.

8. A method of normalizing a gap error signal of a near field optical recording/reproducing apparatus, the method comprising:
   measuring an amplitude of a driving signal applied to a light source of the near field optical recording/reproducing apparatus and an amplitude of the gap error signal in a far field state of the near field optical recording/reproducing apparatus when the near field optical recording/ reproducing apparatus is initialized;
   calculating a normalization factor by dividing the amplitude of the driving signal applied to the light source by the amplitude of the gap error signal measured in the far field state;
   measuring the amplitude of the driving signal applied to the light source and the amplitude of the gap error signal during reproduction or recording operations of the near field optical recording/reproducing apparatus; and
   generating a normalized gap error signal by dividing the amplitude of the gap error signal, measured during the reproduction or recording operations of the near field optical recording/reproducing apparatus, by the amplitude of the driving signal measured during the reproduction or recording operations of the near field optical recording/reproducing apparatus, and multiplying a result of the division by the normalization factor.

9. The method of claim 8, further comprising performing a gap servo operation of the near field optical recording/reproducing apparatus according to the normalized gap error signal.

10. The method of claim 8, further comprising removing high frequency components of the driving signal and the gap error signal using a low pass filter prior to the calculating of the normalization factor and the generating of the normalized gap error signal.

11. The method of claim 8, wherein the normalized gap error signal is constantly maintained to be a preset optimized value regardless of the recording and reproduction operations of the near field optical recording/reproducing apparatus.

12. A near field optical recording/reproducing apparatus used to record/reproduce information to/from an optical medium, comprising:
   a light source configured to emit light;
   an objective lens configured to focus the light emitted from the light source;
   a solid immersion lens configured to receive the focused light from the objective lens to generate an evanescent wave of the focused light, and to totally reflect a portion of the focused light back towards the light source;
   a photodetector configured to measure an amplitude of a gap error signal from the totally reflected portion of the focused light; and
   an operating unit configured to generate a normalized gap error signal by using an amplitude of a driving signal applied to the light source to emit the light and the amplitude of the gap error signal measured by the photodetector, the normalized gap error signal being used to maintain a constant gap between the solid immersion lens and the optical medium,
   wherein the normalized gap error signal is a constant value during both a recording operation and a reproducing operation of the near field optical recording/reproducing apparatus.

13. The near field optical recording/reproducing apparatus of claim 12, wherein the operating unit is configured to generate the normalized gap error signal by dividing the amplitude of the gap error signal by the amplitude of the driving signal used by the light source to emit the light.

14. The near field optical recording/reproducing apparatus of claim 12, wherein the operating unit is configured to generate the normalized gap error signal by dividing the amplitude of the gap error signal, obtained during the reproduction or the recording operations of the near field optical recording/ reproducing apparatus, by the amplitude of the driving signal used by the light source to emit the light, the amplitude of the driving signal being measured during the reproduction or the recording operations of the near field optical recording/reproducing apparatus, and multiplying by a normalization factor.

15. The near field optical recording/reproducing apparatus of claim 14, wherein the normalization factor is obtained by dividing the amplitude of the driving signal, measured in a far field state of the near field optical recording/reproducing apparatus, by the amplitude of the gap error signal, measured in the far field state thereof.

16. The near field optical recording/reproducing apparatus of claim 13, further comprising:
   a first low pass filter arranged between the light source and the operating unit with respect to the driving signal, the first low pass filter being configured to remove a high frequency component of the driving signal provided to the operating unit; and
   a second low pass filter arranged between the photodetector and the operating unit with respect to the gap error signal, the second low pass filter being configured to remove a high frequency component of the gap error signal provided to the operating unit.

17. The near field optical recording/reproducing apparatus of claim 12, wherein the operating unit is configured to generate the normalized gap error signal by using an amplitude of a driving signal applied to the light source to emit the light in a far field state and a near field state of the optical recording/reproducing apparatus and an amplitude of the gap error signal measured by the photodetector in the far field state and the near field state of the optical recording/reproducing apparatus.

18. A method of performing a gap servo control of a near field optical recording/reproducing apparatus using a normalized gap error signal, the method comprising:
    measuring an amplitude of a gap error signal from a portion of a focused light that is totally reflected from a solid immersion lens of the near field optical recording/reproducing apparatus;
    generating the normalized gap error signal by using an amplitude of a driving signal used by a light source of the near field optical recording/apparatus to emit a light to be focused into the focused light and the amplitude of the gap error signal, the normalized gap error signal being that maintains a constant value during both a recording operation and a reproducing operation of the near field optical recording/reproducing apparatus; and
    using the normalized gap error signal to maintain a constant gap between the solid immersion lens and an optical medium.

19. The method of claim 18, wherein the generating of the normalized gap error signal includes dividing the amplitude of the gap error signal by the amplitude of the driving signal used by the light source of the near field optical recording/reproducing to emit the light to be focused into the focused light.

20. The method of claim 19, the generating of the normalized gap error signal further includes:
    removing a high frequency component of the driving signal; and
    removing a high frequency component of the gap error signal.

* * * * *